US009527650B2

(12) United States Patent
Jordan

(10) Patent No.: US 9,527,650 B2
(45) Date of Patent: Dec. 27, 2016

(54) CHAMBERED CONTAINER FOR THE MIXING AND STORAGE OF FLUIDS

(76) Inventor: James Jordan, Ashley, OH (US)

( * ) Notice: Subject to any disclaimer, the term of this patent is extended or adjusted under 35 U.S.C. 154(b) by 0 days.

(21) Appl. No.: 13/417,987

(22) Filed: Mar. 12, 2012

(65) Prior Publication Data

US 2013/0233738 A1 Sep. 12, 2013

(51) Int. Cl.

| | |
|---|---|
| ***B65D 5/38*** | (2006.01) |
| ***G01F 11/28*** | (2006.01) |
| ***B65D 1/24*** | (2006.01) |
| ***B65D 81/32*** | (2006.01) |
| ***B65D 21/02*** | (2006.01) |
| ***B65D 25/56*** | (2006.01) |
| *B67D 7/74* | (2010.01) |

(52) U.S. Cl.
CPC ....... *B65D 81/3205* (2013.01); *B65D 21/0204* (2013.01); *B65D 25/56* (2013.01); *B67D 2007/746* (2013.01)

(58) Field of Classification Search
CPC ........... B67D 7/74; B65D 25/56; F16N 27/00; G01F 11/263
USPC .......... 215/6; 222/143, 26, 158, 29, 424, 25, 222/455, 318, 155, 130, 183, 451, 456, 454, 222/476, 144.5, 145.5; 220/23.4; 137/571, 264, 137/558, 896, 114, 499; 141/364; 184/7.4; 73/426, 864.63, 864.16, 61.43
See application file for complete search history.

(56) References Cited

U.S. PATENT DOCUMENTS 1,570,010 A * 1/1926 Scowcroft, Jr. ............... 137/576
2,161,060 A * 6/1939 Kelsey .......................... 137/574
2,405,442 A * 8/1946 Mayo ......................... 366/182.3
2,484,391 A * 10/1949 Treiss, Jr. .................. 241/101.3
2,532,787 A * 12/1950 Romyns .................. G01F 11/32 222/442
2,631,608 A * 3/1953 Rosenberg .................... 137/576
2,788,801 A * 4/1957 Mowat .......................... 137/576
2,814,308 A * 11/1957 Mowat .......................... 137/576
2,908,289 A * 10/1959 Everett .......................... 137/576
2,945,509 A * 7/1960 Tuttle ............................ 137/576
2,986,162 A * 5/1961 Spexarth ....................... 137/571
3,024,806 A * 3/1962 Colonna .................. B67D 7/74 137/605
3,058,353 A * 10/1962 Irwin .............................. 73/428
3,134,521 A * 5/1964 Van Maasdam ...... G01F 11/263 222/443
3,141,574 A * 7/1964 Donoghue ............ G01F 11/084 222/157
3,269,389 A * 8/1966 Meurer et al. ........... 128/200.14
3,277,931 A * 10/1966 Emrick ......................... 141/364
4,069,835 A * 1/1978 Stadler ................. G05D 11/006 137/114
4,262,710 A * 4/1981 Nomura et al. ................ 141/98
4,294,273 A * 10/1981 Isberg ............................... 137/1
4,294,372 A * 10/1981 Onishi .......................... 220/501
4,298,038 A * 11/1981 Jennings ........................... 141/2
4,370,998 A * 2/1983 Kimpara ....................... 137/264
4,381,841 A * 5/1983 Schwarz ...................... 220/23.4
(Continued)

*Primary Examiner* — J. Gregory Pickett
*Assistant Examiner* — Gideon Weinerth
(74) *Attorney, Agent, or Firm* — Barney DeBrosse, LLC

(57) ABSTRACT

Described herein is a chambered container that allows for the mixture of two liquids in a specific ratio that includes first and second chambers for storing liquid. A dispensing device passing positioned to deliver liquid from the second chamber into the first chamber. Graduated portions are found on the container in order to accurately measure the amount of fluid in each of the chambers. The container may also have a coating of non-slip material.

3 Claims, 12 Drawing Sheets

(56) References Cited

U.S. PATENT DOCUMENTS

| | | | | | |
|---|---|---|---|---|---|
| 4,445,370 | A * | 5/1984 | Whitmire | F01M 3/00 116/227 |
| 4,509,659 | A * | 4/1985 | Cloutier | B67D 7/743 137/571 |
| 4,546,750 | A * | 10/1985 | Brunell et al. | 123/514 |
| 4,549,585 | A * | 10/1985 | Emerson | B67D 7/741 141/105 |
| 4,589,777 | A * | 5/1986 | Soler | 366/151.1 |
| 4,640,446 | A | 2/1987 | Walker | |
| 4,778,087 | A * | 10/1988 | Desai | G01F 11/263 222/449 |
| 4,819,833 | A * | 4/1989 | Huddleston et al. | 222/155 |
| 4,860,927 | A * | 8/1989 | Grinde | 222/158 |
| 4,889,254 | A * | 12/1989 | Vola | 220/23.4 |
| 4,972,972 | A * | 11/1990 | Goguen | 222/130 |
| 5,022,547 | A * | 6/1991 | Spangler et al. | 220/23.4 |
| 5,044,527 | A * | 9/1991 | Hickerson | G01F 11/263 222/451 |
| 5,108,016 | A * | 4/1992 | Waring | B01F 15/04 220/219 |
| 5,123,460 | A * | 6/1992 | Reed | B65D 1/20 141/320 |
| 5,165,576 | A * | 11/1992 | Hickerson | G01F 11/262 222/158 |
| 5,292,039 | A * | 3/1994 | Neofitou | G01F 11/263 222/158 |
| 5,295,610 | A | 3/1994 | Levison | |
| 5,325,996 | A * | 7/1994 | Bannigan | A47G 19/12 222/129 |
| 5,406,995 | A * | 4/1995 | Gantzer | 141/325 |
| 5,433,242 | A * | 7/1995 | Buchtel et al. | 137/212 |
| 5,447,245 | A * | 9/1995 | Merhar | 215/6 |
| 5,556,011 | A * | 9/1996 | Jennings et al. | 222/455 |
| 5,575,354 | A * | 11/1996 | Taylor | 184/7.4 |
| 5,884,580 | A * | 3/1999 | Faircloth, Jr. | 119/51.5 |
| 5,941,416 | A * | 8/1999 | Balz | B67D 7/74 222/1 |
| 6,006,935 | A * | 12/1999 | Driver | 220/23.4 |
| 6,022,134 | A * | 2/2000 | Andrews | 366/130 |
| 6,082,591 | A * | 7/2000 | Healey | 222/158 |
| 6,123,214 | A * | 9/2000 | Goebel | 220/23.4 |
| 6,138,853 | A * | 10/2000 | Frechette | 220/212.5 |
| 6,250,154 | B1 * | 6/2001 | Cheresko | 73/426 |
| 6,263,902 | B1 * | 7/2001 | Booth | 137/264 |
| 6,478,180 | B1 | 11/2002 | Dehn, Sr. | |
| 6,719,161 | B1 | 4/2004 | Craig | |
| 6,851,580 | B2 * | 2/2005 | Stank | B65D 81/3222 206/221 |
| 7,014,067 | B1 * | 3/2006 | Daru | B67D 7/04 222/1 |
| 7,185,669 | B2 * | 3/2007 | Bron | 137/98 |
| 7,891,524 | B1 * | 2/2011 | Johnson | B67D 7/005 137/896 |
| 8,157,132 | B1 * | 4/2012 | Johnson | G05D 11/006 137/114 |
| 8,292,122 | B2 * | 10/2012 | Ugone | A01G 25/14 220/23.86 |
| 2001/0030191 | A1 * | 10/2001 | Bopp et al. | 220/23.4 |
| 2002/0117233 | A1 * | 8/2002 | Kellogg | F01M 11/00 141/98 |
| 2004/0238566 | A1 * | 12/2004 | Stank | B65D 81/3222 222/130 |
| 2008/0035671 | A1 * | 2/2008 | Foster | B05B 11/0056 222/129 |
| 2008/0073375 | A1 * | 3/2008 | Nelson | B01F 15/0205 222/129 |
| 2008/0121655 | A1 * | 5/2008 | Schultz | B05B 11/0081 222/129 |
| 2008/0197039 | A1 * | 8/2008 | Martin | 206/459.1 |
| 2009/0283159 | A1 * | 11/2009 | Schaefer, Jr. | 137/587 |
| 2011/0204086 | A1 * | 8/2011 | Karam | 222/25 |
| 2012/0222976 | A1 * | 9/2012 | Cave | 206/219 |
| 2014/0197209 | A1 * | 7/2014 | Debski | B65D 25/52 222/454 |

* cited by examiner

CHAMBERED CONTAINER FOR THE MIXING AND STORAGE OF FLUIDS

TECHNICAL FIELD

Exemplary embodiments of the present invention relate to a liquid container. More particularly, exemplary embodiments of the present invention relate to a partitioned fuel can for mixing oil and gasoline in a predetermined ratio.

BACKGROUND

The mixing of two or more components is frequently necessary in various applications. For example, it is necessary to mix gasoline and oil, in the correct ratio, for the proper operation of two-stroke engines. Commonly, the gas and oil are stored in separate containers, while a separate measuring device may be employed to ensure the proper ratio of components. Still another container may be used to store the mixture of gas and oil. This need to transfer the gasoline and oil may lead to inaccurate calculations of the ration of gasoline to oil or the introduction of foreign material into the mixture that could result in decreased engine performance or mechanical failures.

SUMMARY OF THE INVENTIVE CONCEPT

Accordingly, exemplary embodiments of the inventive concept has the objective to overcome the drawbacks of the prior art, in particular to provide a new and improved container that is capable of storing both gasoline and oil and is capable of providing the proper ratio of gasoline to oil without the need of additional measuring devices.

Exemplary embodiments of the inventive concept include a container having a first and second chamber. Each chamber has a port through which the liquid to be mixed may be placed into the chamber. A dispensing device is placed in the container such that it may transfer a measured amount of liquid from one chamber to the other chamber. In this manner, a user is able to mix one liquid with another in the proper ratios for various applications.

The container may also have a non-slip coating applied thereto to prevent movement while being transported. The container may also include graduated portions so that the amount of fluid in each of the chambers may be determined. The graduated portions also allow the user to determine the amount of fluid delivered from one chamber to the other.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
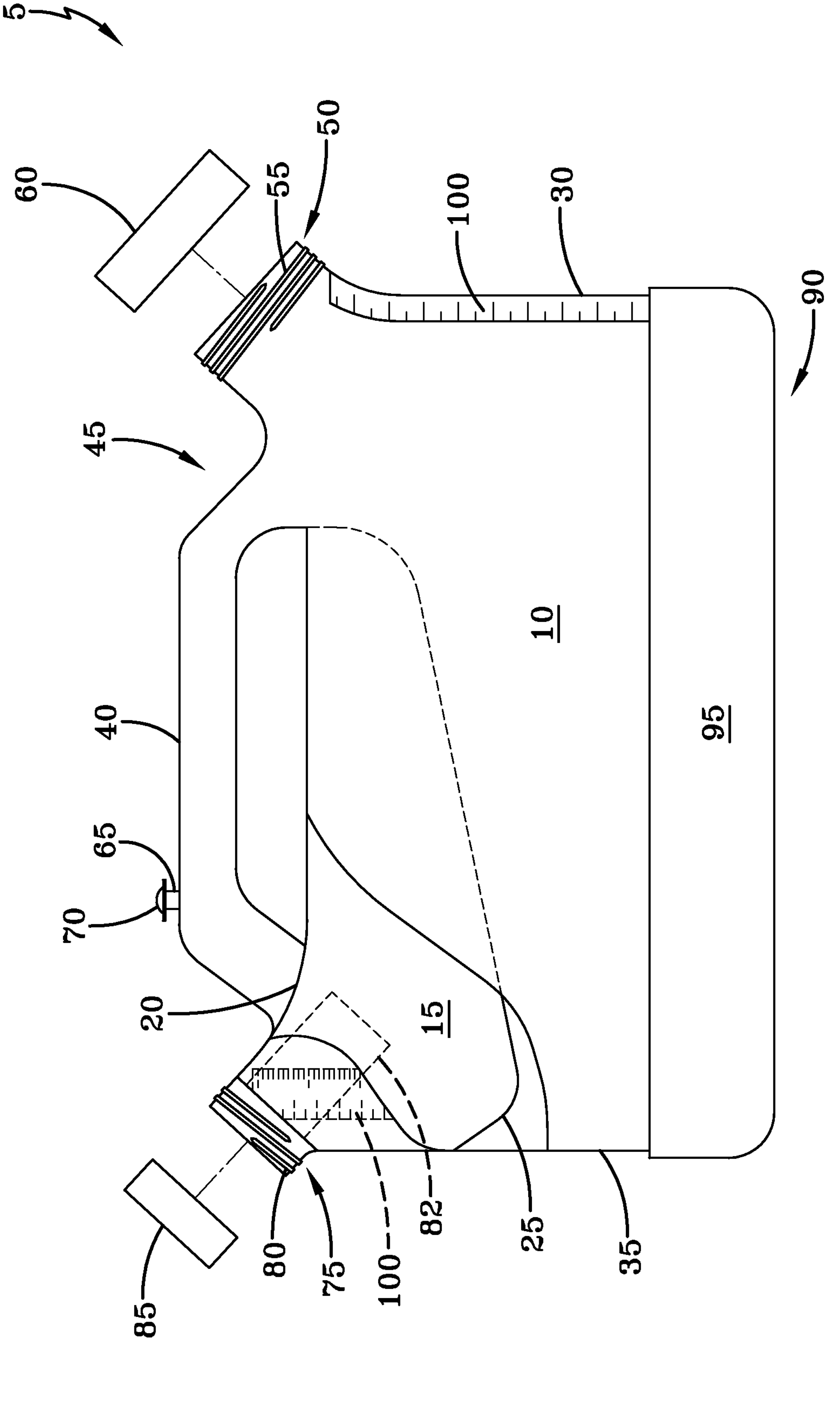
FIG. 1 is a side view of an exemplary embodiment of a liquid container according to the inventive concept illustrating a first chamber and a second chamber defined by a top and bottom partition.

FIG. 1 illustrates a side view of an exemplary container 5 according to the present invention. The container 5 includes a first chamber 10 and a separate and isolated second chamber 15 fixedly positioned within the first chamber 10. The first chamber 10 defines a hollow space which includes all the interior volume thereof except that portion of the volume that is taken up by the second chamber 15 which also defines a hollow space having an interior volume. The second chamber 15 is set apart from the first chamber 10 by a top partition 20 and a bottom partition 25. The first chamber 10 is sealed so as to prevent liquid stored in the first chamber 10 from intruding into the second chamber 15. Likewise, the second chamber 15 is sealed so as to prevent liquid stored in the second chamber 15 from intruding into the first chamber 10, unless desired by using the dispensing device 105 (shown in FIGS. 3-5). In other exemplary embodiments, the second chamber 15 may be separated from the first chamber 10 by a single bottom partition 25, as shown in FIG. 2.

Figure 2:
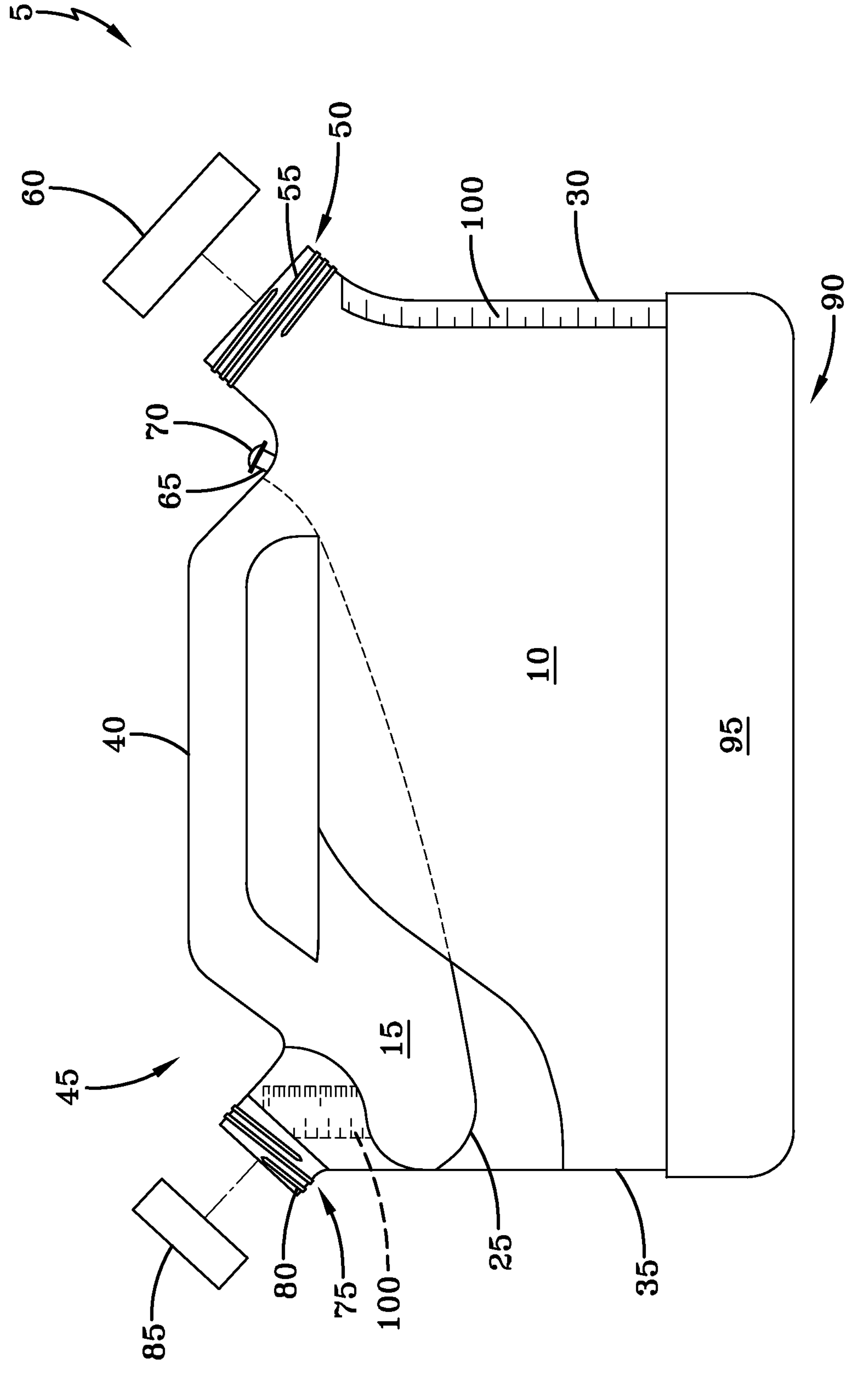
FIG. 2 is a side view of an exemplary embodiment of a liquid container according to the inventive concept illustrating a first chamber and a second chamber defined by a bottom partition.

As shown in FIGS. 1 and 2, the container 5 includes a front wall 30 and a back wall 35. A handle 40 may be formed in the top portion 45 of the container 5. The handle 40 may be formed integral with the container 5 such that the container 5 and the handle 40 are of a unitary design, or the handle 40 may otherwise be attached to the container 5 so as to be removable. As shown, the handle 40 may be shaped to allow a user to grasp the handle 40 in order to carry the container 5. The handle 40 also allows for the container 5 to be lashed down during transportation or to be suspended during storage. Depending on the placement of the partitions 20, 25 the internal volume of the handle 40 may be included in either the first chamber 10 or the second chamber 15.

A first port 50 may be cylindrical and molded into the container 5 where the top portion 45 and the front wall 30 intersect. The first port 50 may extend from the container 5 at an angle as shown in FIGS. 1 and 2 and allows access to the first chamber 10. The angle of the first port 50 is such that it allows complete drainage of the liquid material held within the first chamber 10. The first port 50 may have an external threaded portion 55 to provide a secure attachment point for a cap 60. To prevent leakage of the liquid material held within the first chamber 10, the cap 60 may be secured to the threaded portion 55. The threaded portion 55 of the first port 50 may also allow for the attachment of a nozzle or funnel (not shown in the Figures) to the first port 50 to assist in the dispensing of the liquid within the first chamber 10. The cap 60 may also have a funnel connected thereto. In still other exemplary embodiments the cap 60 maybe a nozzle, wherein the nozzle may have an optional air release. This funnel or nozzle assembly may be used on any of the embodiments described herein on both the first and second chamber ports or outlets.

As illustrated in FIGS. 1 and 2, a vent 65 may be positioned either in the handle 40 (as shown in FIG. 1), or in the top portion 45 of the container 5 (as shown in FIG. 2). The vent 65 allows air to pass therethrough in order to allow even flow of the liquid material from the first chamber 10. To prevent liquid from escaping the vent 65 a cap 70 may be placed on the vent 65. In some embodiments, to prevent the loss of the cap 70, the cap 70 may be attached to the container 5.

A second port 75 for filling and dispensing liquid into the second chamber 15 is positioned near the intersection of the top portion 45 and the back wall 35 of the container 5. The second port 75 may be cylindrical and have an external threaded portion 80. A cap 85 may be secured to the second port 75 to prevent leakage of the liquid material from the second chamber 15. To also assist with leak prevention, an inverted funnel 82 may extend inwardly into the second chamber 15 from the second port 75. The inverted funnel 82 prevents the liquid contained in the second chamber 15 from escaping. For convenience, the second chamber 15 may have a size sufficient to easily hold a full quart of liquid.

To prevent the container 5 from slipping during transportation the bottom portion 90 of the container 5 may be coated with a non-slip material 95. In still other embodiments, the container 5 may be made from a non-slip material 95.

In order to determine the amount of liquid that has been placed into, dispensed from, or remains in both the first and second chambers 10, 15, each chamber 10, 15 respectively has graduated portions 100 provided over the vertical height of both the first and second chambers 10, 15. In some embodiments, the container 5 may be opaque but the graduated portions 100 may be transparent in order to accurately measure the amount of liquid within the chambers 10, 15. In other exemplary embodiments, the entire container may be substantially transparent in order to both see and measure the contents of both chambers 10, 15. In still other exemplary embodiments, the at least one chamber 10, 15 may be opaque while at least one chamber 10, 15 may be transparent. It should be understood by those skilled in the art that the graduated portions 100 may be located at any position on the container 5.

Figure 3:
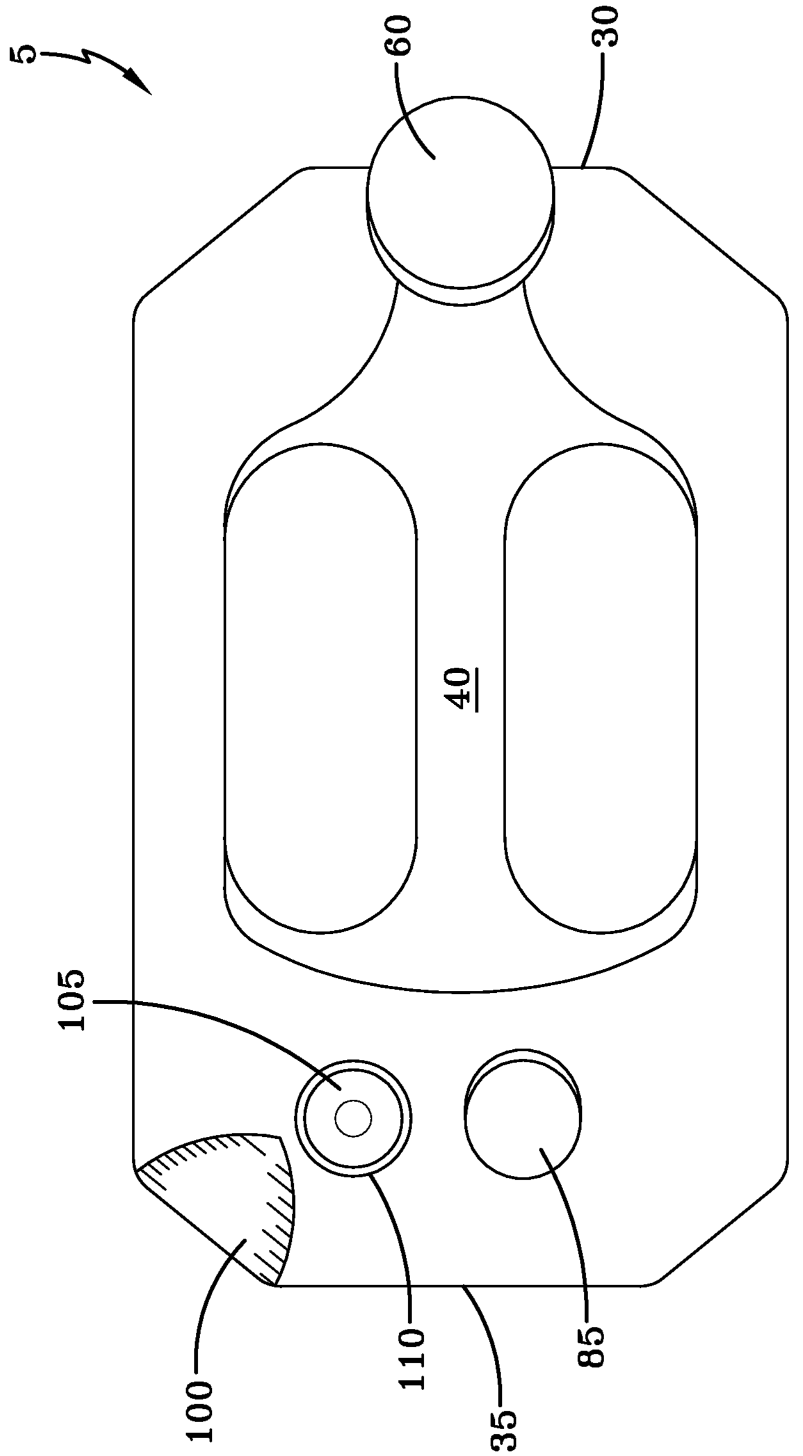
FIG. 3 is a top view of an exemplary embodiment of a liquid container according to the inventive concept illustrating an exemplary dispensing device atop the container.

FIG. 3 is a top view of an exemplary container 5 according to the inventive concept. As seen in FIG. 3, a dispensing device 105 is positioned adjacent to the second port 75. The dispensing device 105 extends through the outer wall of the container 5 and passing through the second chamber 15 and is in communication with the interior volume of the first chamber 10. The dispensing device 105 is positioned to correspond with the lowest portion of the second chamber 15. A guard 110 may extend outward from the container 5 beyond the dispensing device 105 and prevents the accidental activation of the dispensing device 105. In other exemplary embodiments, the guard 110 may be integral with the dispensing device 105. The dispensing device 105 will be explained more fully in discussions related to FIGS. 4 and 5.

Figure 4:
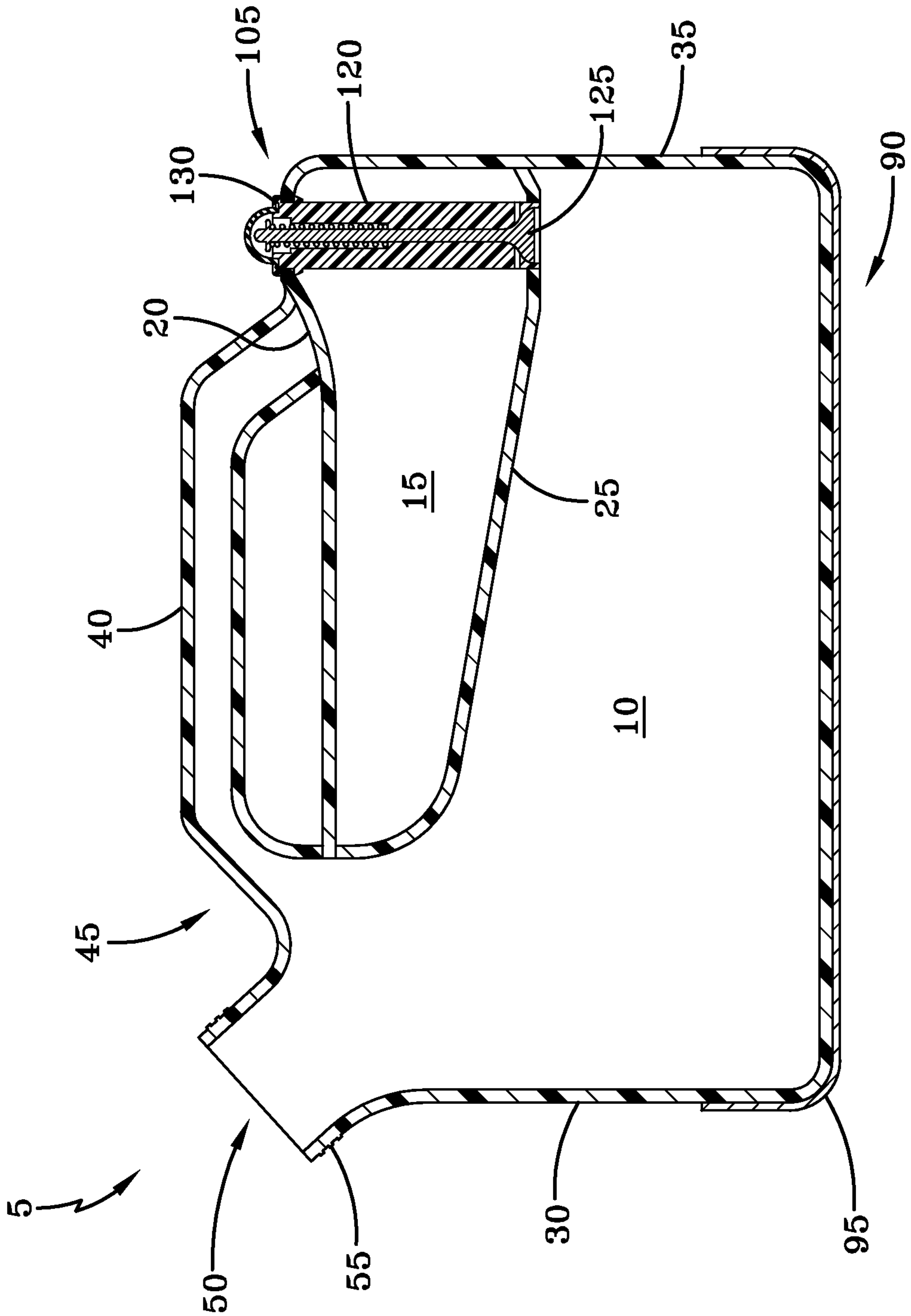
FIG. 4 is a cross-sectional view of an exemplary embodiment of a liquid container according to the inventive concept illustrating an exemplary dispensing device in the closed position.
Figure 5:
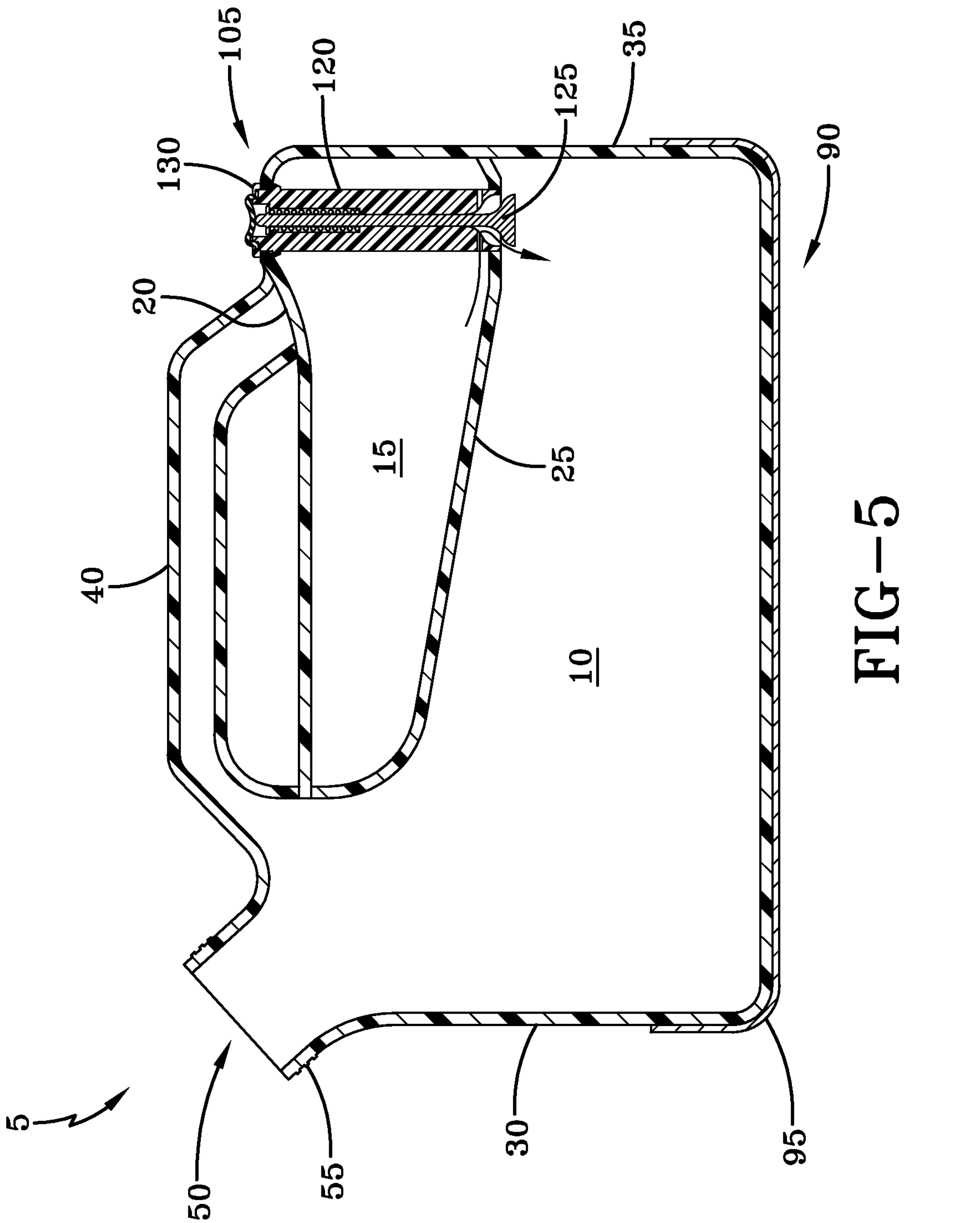
FIG. 5 is a cross-sectional view of an exemplary embodiment of a liquid container according to the inventive concept illustrating an exemplary dispensing device in the open position.

FIGS. 4 and 5 are both cross-sectional views of exemplary containers 5 according to the inventive concept. FIG. 4 illustrates the dispensing device 105 in a closed configuration, thus preventing liquid from the second chamber 15 from entering the first chamber 10. FIG. 5 illustrates the dispensing device 105 in an open configuration, thus allowing liquid from the second chamber 15 to enter the first chamber 10. As seen in FIGS. 4 and 5, the dispensing device 105 extends through the exterior of the container 5 and passes through the second chamber 15. The dispensing device 105, shown in FIGS. 4 and 5 has a cylindrical exterior covering 120 and an internal plunger 125.

The plunger 125 is biased in the closed position to prevent the liquid in the second chamber 15 from entering the first chamber 10. The dispensing device 105 has a seal 130 that prevents liquid from leaking from the dispensing device 105 and allows a user to depress the plunger 125 thus placing the dispensing device 105 in the open position. The dispensing device 105 may pass though any portion of the second chamber 15, although it may be beneficial to pass the dispensing device 105 through the second chamber 15 at the lowest point of the second chamber 15 in order to be able to dispense all the liquid from the second chamber 15.

To take full advantage of the exemplary container 5 described herein, the first chamber 10 is filled with a fluid such as gasoline. The first port 50 allows the gasoline to be placed into the first chamber 10. Two-cycle oil is then placed into the second chamber 15 by way of the second port 75. The first and second chambers 10, 15 keep the liquids sequestered until the dispensing device 105 is used. Once the liquids have been placed in their respective chambers 10, 15 the user may determine the proper ratio of oil to gasoline needed for a particular application. Once the ratio is determined, the user activates the dispensing device 105 and delivers a measured amount of oil from the second chamber 15 into the first chamber 10 to mix with the gasoline. After the proper amount of oil is delivered to the first chamber 10, the user releases the dispensing device 105 and the two liquids are again sequestered. The user may then agitate the container 5 in order to get a uniform mixture between the oil and gasoline. Although gasoline and oil are specifically mentioned, it should be understood that the exemplary container would be effective to mix any two liquids.

Although a specific dispensing device 105 is described herein, it would be understood by those having skill in the art that other devices that can provide a measured amount of liquid from one chamber to another are contemplated by the inventive concept.

Figure 7:
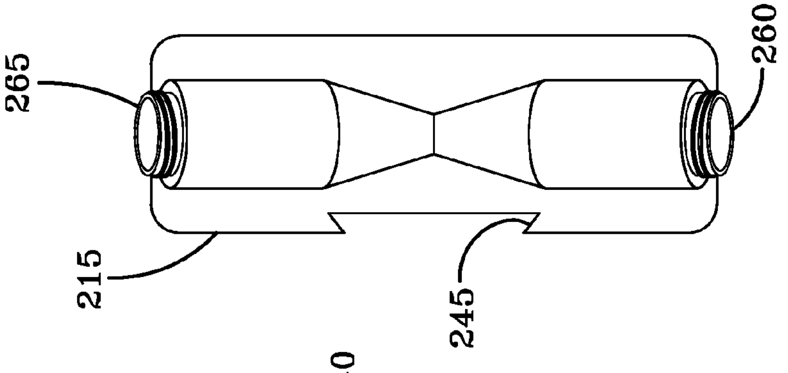
FIG. 7 is a top view of an exemplary embodiment of a removable second chamber made to complementarily engage and lock together with a first chamber.
Figure 6:
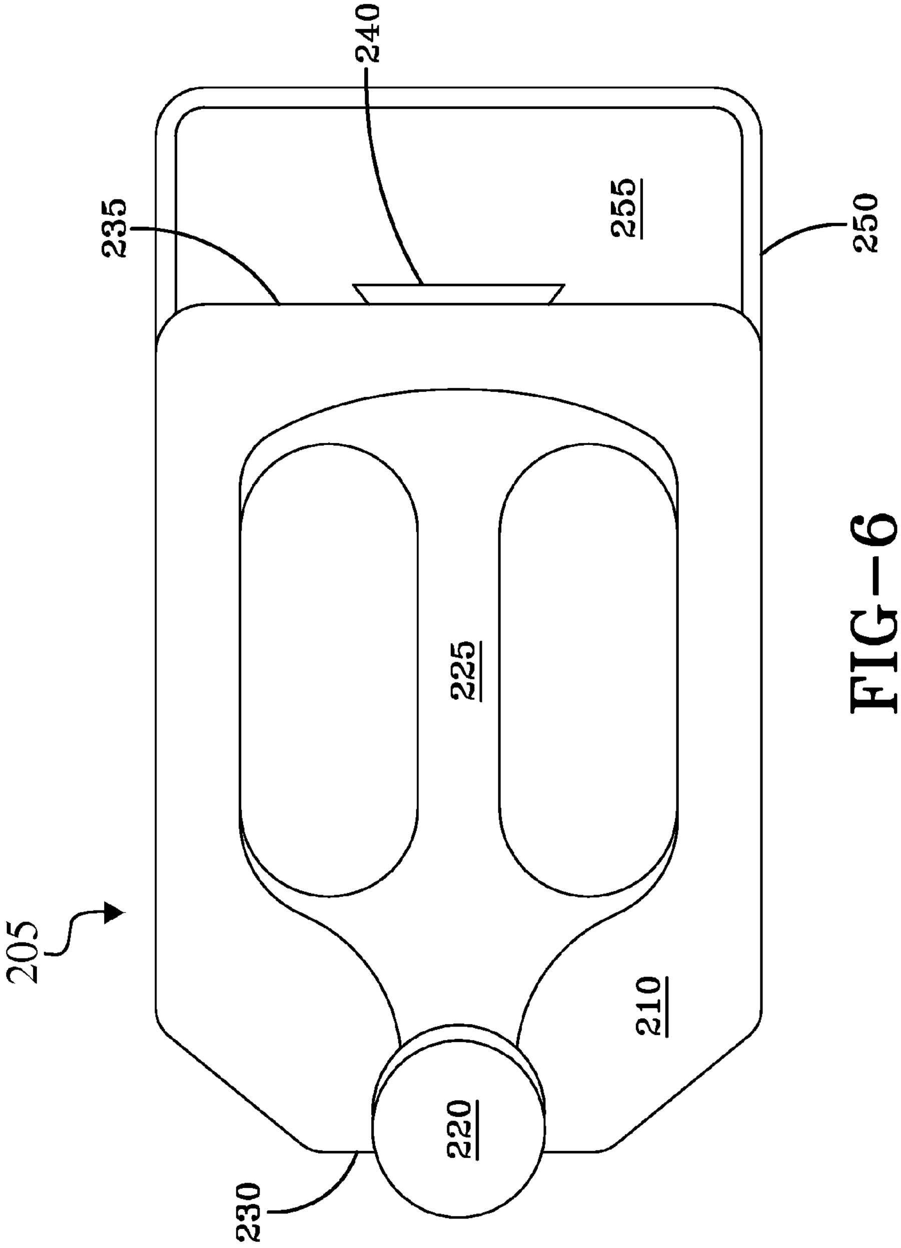
FIG. 6 is a top view of another exemplary embodiment of a liquid container according to the inventive concept wherein a second chamber is removable from the container.
Figure 8:
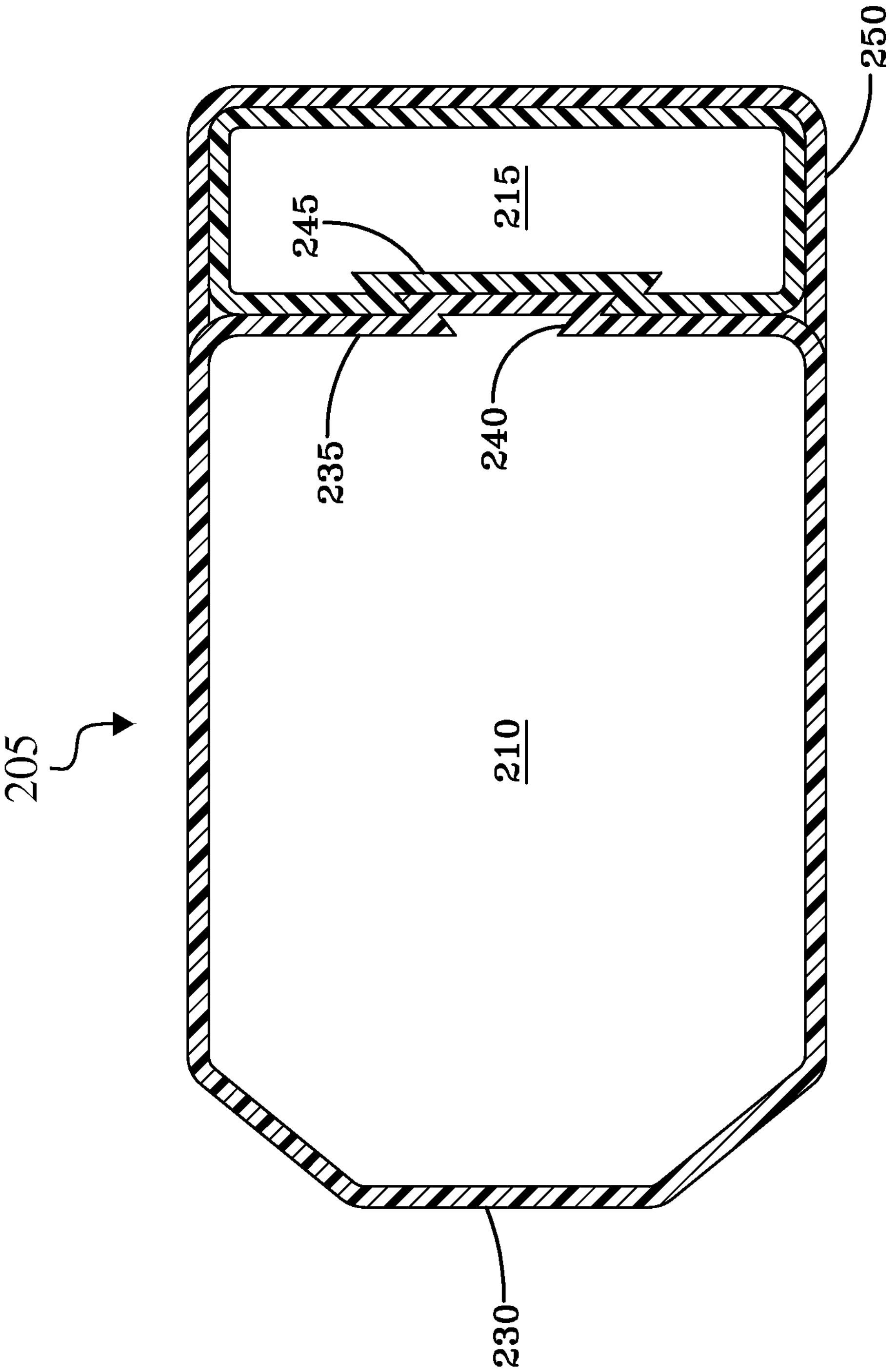
FIG. 8 is a cross-sectional view of an exemplary embodiment of a liquid container having a removable second chamber adapted to complementarily engage and lock together with a first chamber.

FIGS. 6-8 illustrates another exemplary embodiment of the inventive concept. FIGS. 6 and 7 show the individual components of the exemplary container 205 while FIG. 8 provides a cross-sectional view illustrating how the first and second chamber 210, 215 lock together. In the exemplary embodiment, the first chamber 210 has a handle portion 225. Liquid may be poured into the first chamber 210 through the opening 220. The opening 220 is adapted to accept a cap or other type of closure to ensure the liquid remains in the first chamber 210. As with other the embodiments, there is a front wall 230 and a back wall 235. Along the back wall 235 there is a dovetail portion 240. The dovetail portion 240 is adapted to complementarily engage with the dovetail receiving portion 245 of the second chamber 215. A protective coating 250 is placed on the bottom portion of the first chamber 210 and extends outward beyond the back wall 235 and associated dovetail portion 240. This outward extending portion of the protective, non-slip coating 250 forms a pocket 255 into which the second chamber 215 nests into. When being placed into the pocket 255, dovetail receiving portion 245 receives the dovetail portion 240 of the first chamber 215 in order to lock the second chamber 215 to the first chamber 210.

The dovetail receiving portion 245 may extend the entire height of the second chamber 215 or, as shown in FIG. 7, it may only extend a predetermined portion of the height of the second chamber 215. The interlocking of the first and second chambers 210, 215 is shown in the cross-sectional view found in FIG. 8. Although a dovetail joint is contemplated, it should be understood that other types of joints or fasteners may be used to lock or irremovably affix the second chamber 215 to the first chamber 210. In still other exemplary embodiments, more than one dovetail portion 255 may be used to affix the second chamber 215 to the first chamber 210.

The second chamber 215 may have an inlet 260 and an outlet 265. The inlet 260 allows for the liquid to be placed in the second chamber 215. The outlet 265 may be utilized to remove the liquid contained within the second chamber 215. As with other embodiments, each chamber 210, 215 may have a graduated portion to indicate how much liquid is contained within the chamber 210, 215 and how much liquid have been dispensed therefrom. In use, a first liquid such as gasoline is placed in the first chamber 210 and a second liquid is placed in the second chamber 215, such as two-cycle oil. To mix the liquids, the second chamber 215 is removed from the pocket 255 and the dovetail portion 255. A measured amount of liquid is then dispensed from the second chamber 215 into the first chamber 210. The second chamber 215 is then placed back into the pocket 255 and affixed to the first chamber 210. In some embodiments, the second chamber 215 is reusable and in other embodiments it may be disposable. In embodiments were the second chamber 215 is disposable the second chambers 215 may be purchased, pre-filled, separately from the first chamber 210.

Figure 9:
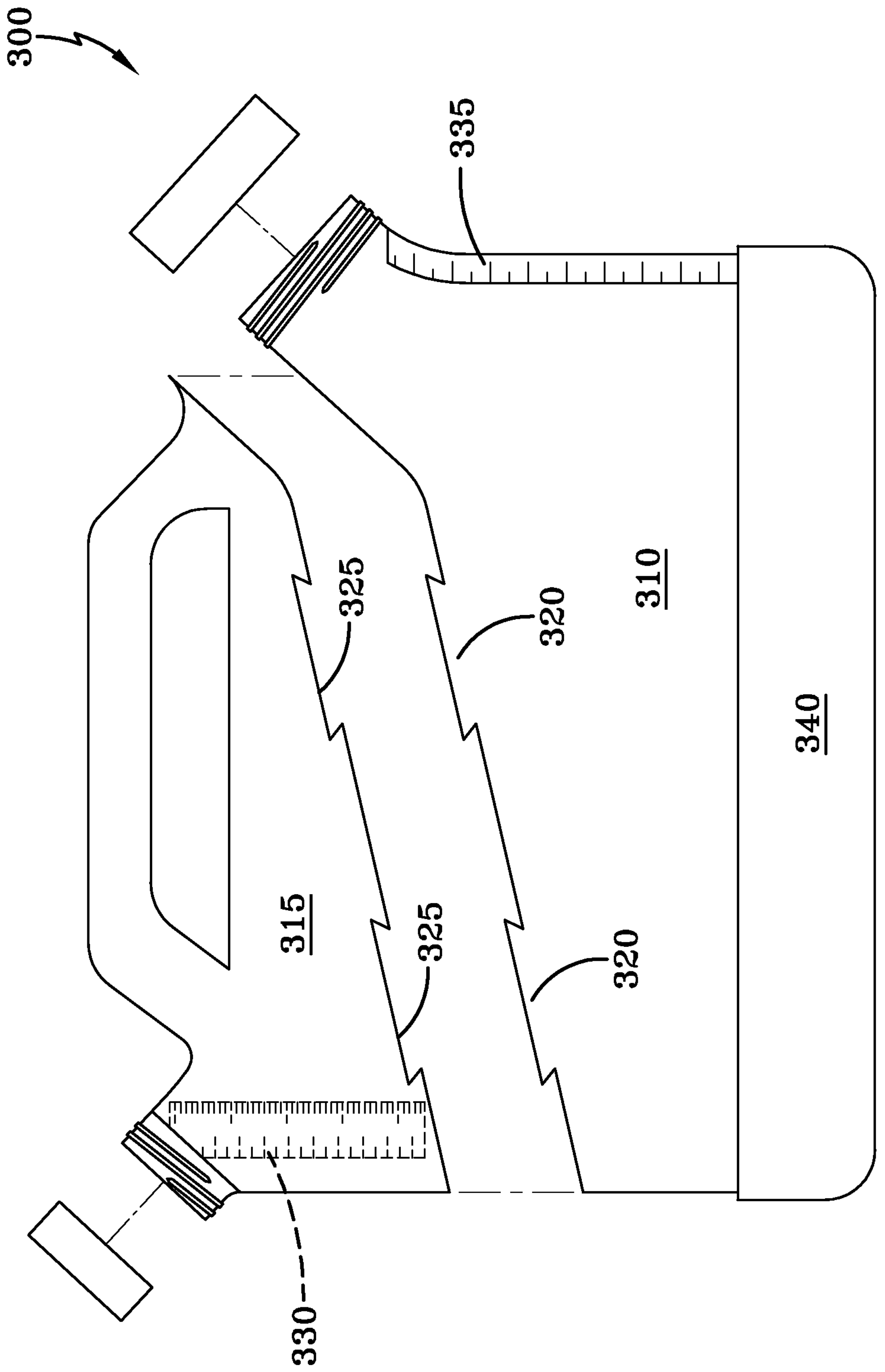
FIG. 9 is a side view of another exemplary embodiment of a container according to the inventive concept wherein the container has a removable second chamber that is atop a first chamber and locked thereto.
Figure 10:
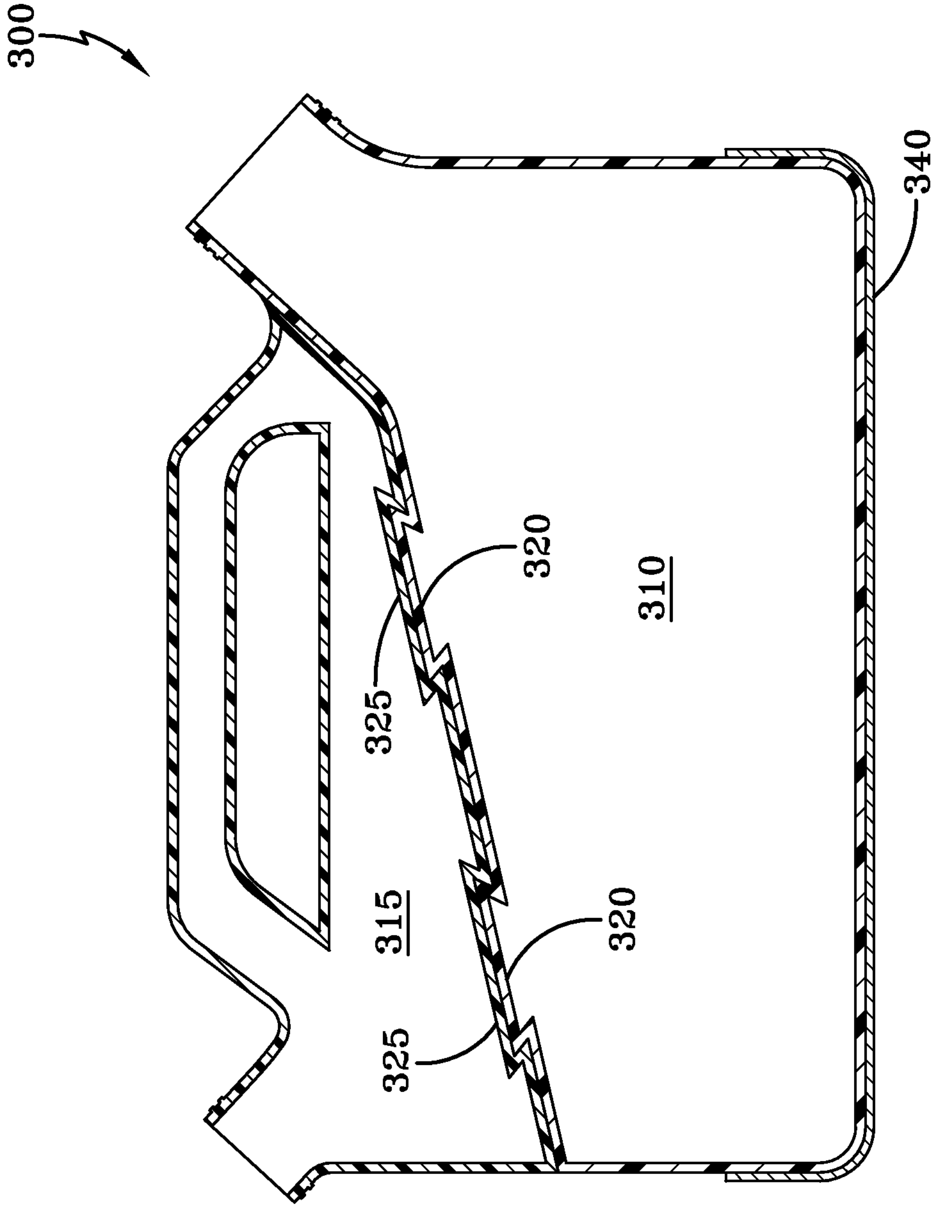
FIG. 10 is a cross sectional view of the exemplary container shown in FIG. 9, wherein the second chamber is locked to the first chamber.

Another exemplary container 300 is shown in FIGS. 9 and 10, the container 300 having a first chamber 310 and a second chamber 315. As shown, the second chamber 315 is removably affixed to the top of the first chamber 310. The first chamber 310 has dovetail portions 320 and the second chamber 315 has corresponding dovetail receiving portions 325. Each of the chambers 310, 315 has a graduated portion 330, 335. The bottom of the first chamber 315 is covered in a protective covering 340 that also reduces sliding while being transported. In this embodiment, it may be possible to include the dispensing device illustrated in FIGS. 4 and 5 to dispense the liquid from the second chamber 315 into the first chamber 310. In other exemplary embodiments, the second chamber 315 may be removed to pour the liquid contained therein directly into the first chamber 310.

Figure 11:
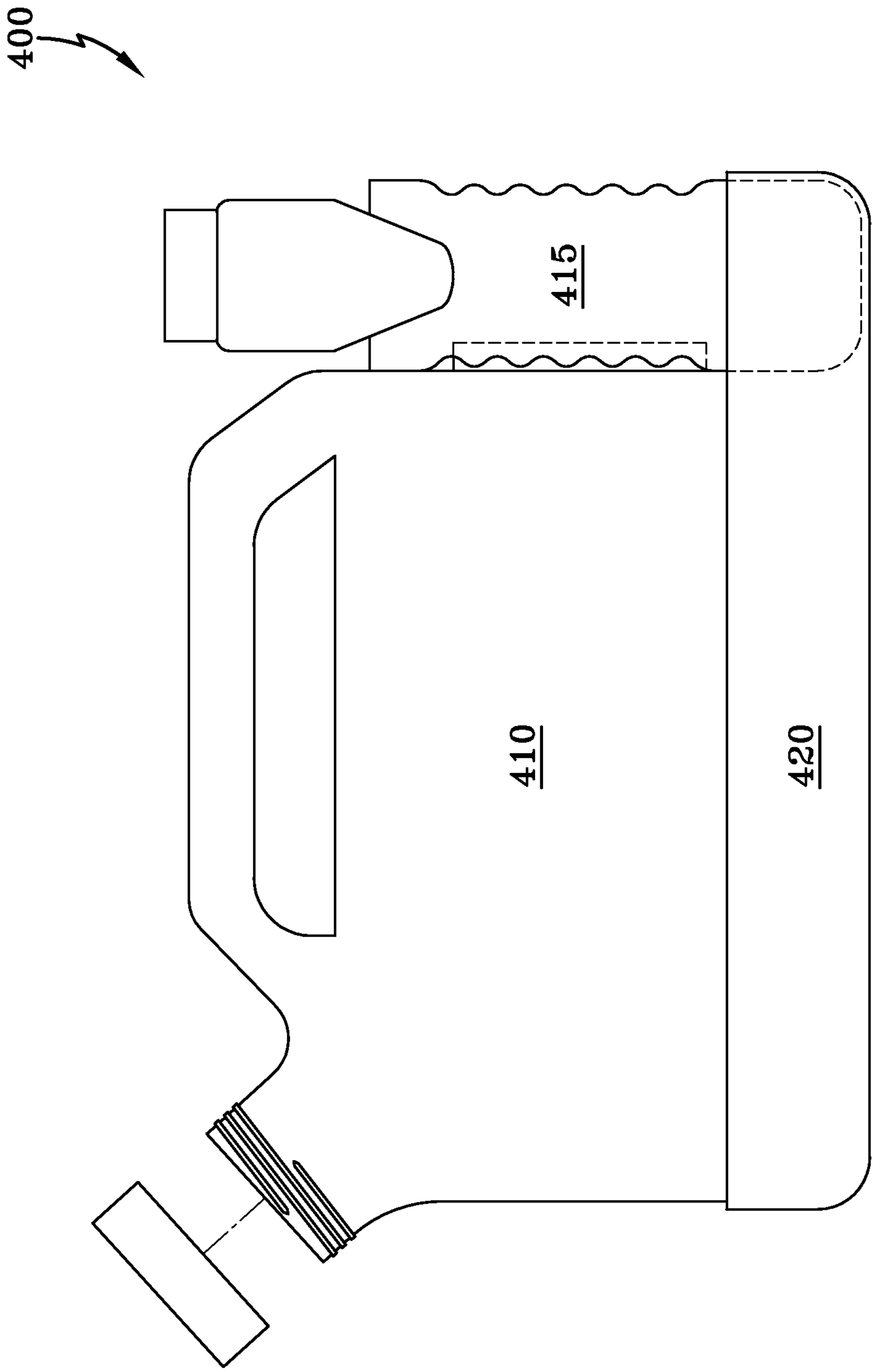
FIG. 11 is still another exemplary embodiment of the inventive concept illustrating an exemplary container having a removable second chamber.
Figure 12:
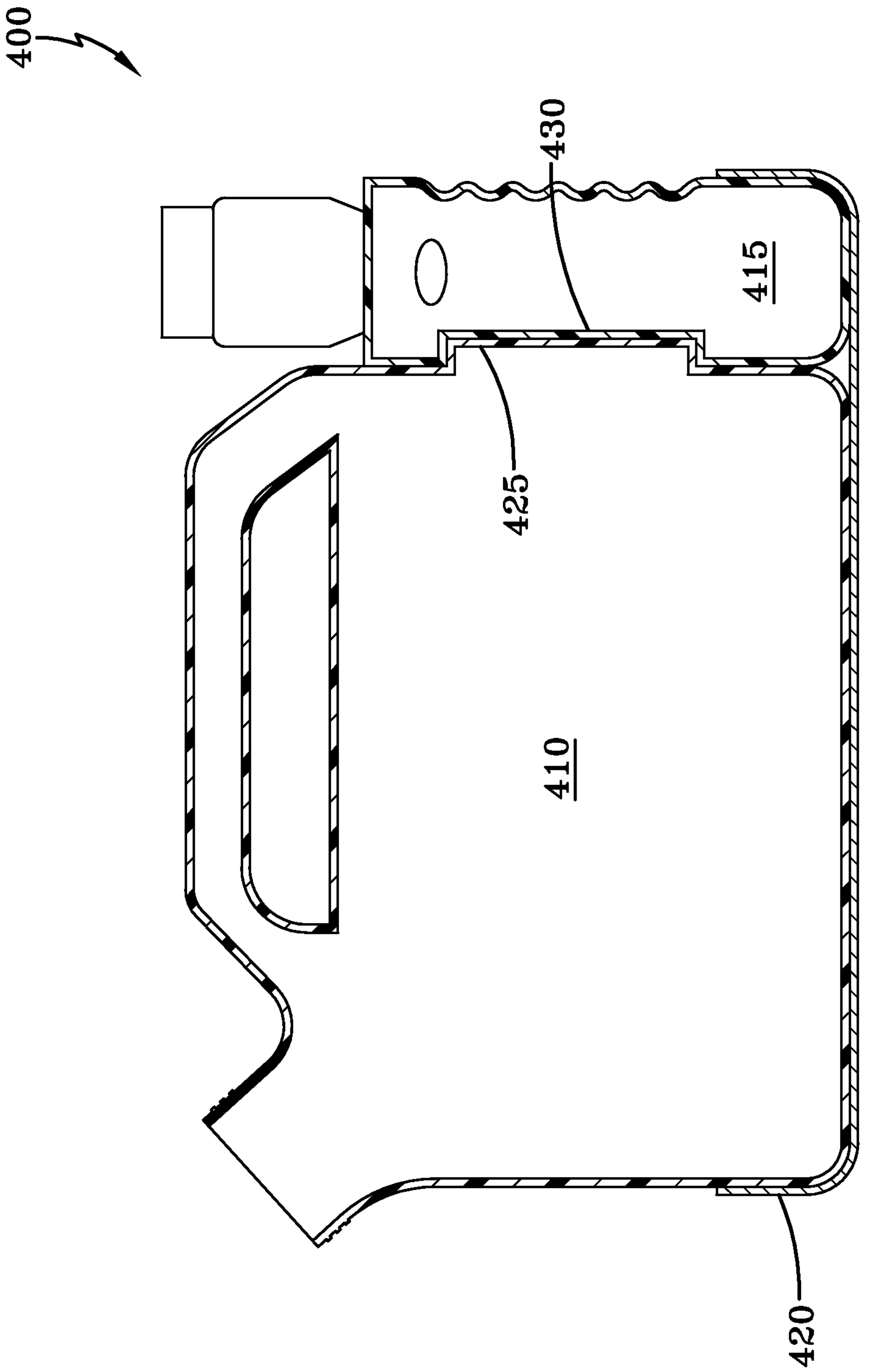
FIG. 12 is a cross-sectional view of the exemplary container shown in FIG. 11.

FIGS. 11 and 12 illustrate a similar container embodiment to that shown in FIGS. 6 and 7. As can be seen in this embodiment, the container 400 has a first chamber 410 and a second chamber 415. Similar to previous embodiments, the bottom of the first chamber 410 is covered in a protective coating 420 and extends beyond the first chamber 410 to hold the bottom portion of the second chamber 415. In this embodiment, rather than having a dovetail portion, the first chamber 415 has a protrusion 425 extending therefrom, as seen in the cross-sectional view. To hold the second chamber 415 in place, the second chamber 415 may have a groove 430 adapted to receive the protrusion 425. To engage the first and second chambers 410, 415 the second chamber 415 may be inserted at an angle into the protective coating 420. Once inserted into the protective coating 420, the second chamber 415 may be moved toward the first chamber 410 so that the groove 430 portion of the second chamber 415 receives the protrusion 425 of the first chamber 410. To hold the second chamber 415 in place, the protrusion 425 and the groove 430 may snap together.

Figure 13:
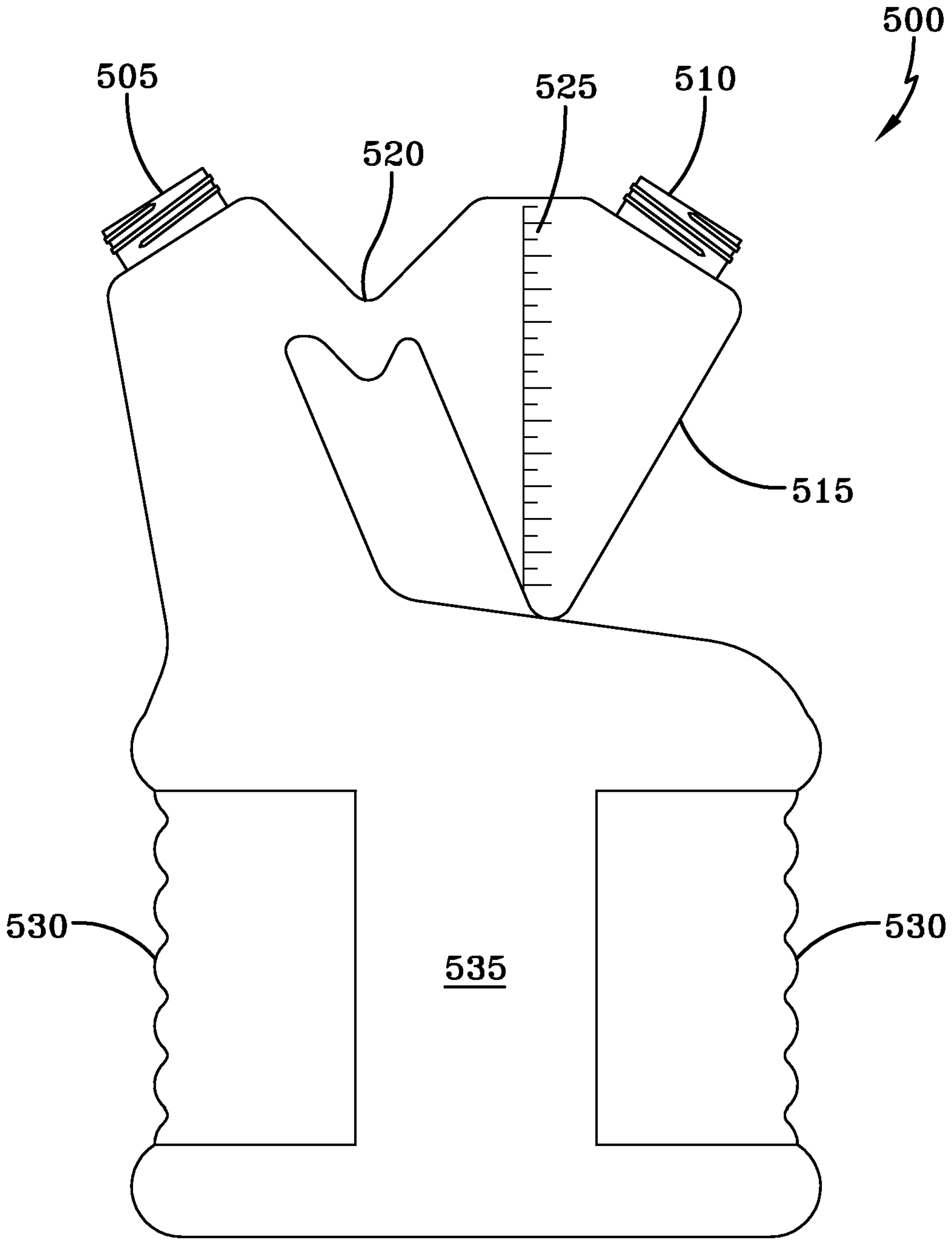
FIG. 13 is a rear view of an exemplary embodiment of a second chamber according to the inventive concept.

FIG. 13 illustrates an exemplary second chamber 500 for use with container embodiments found in FIGS. 6-8 and 11-12. As also shown in FIG. 7, the second chamber 500 has an inlet 505 and an outlet 510. A liquid is poured into the second chamber 500 through the inlet 510. A cap (not shown) or other similar device may be used to seal the inlet 505 to prevent liquid contained within the second chamber 500 from escaping. A dispensing reservoir 515 is in communication with the main body 535 of the second chamber 500 by way of an angled connection 520. A graduated portion 525 may be provided on the dispensing reservoir 515 to detect the amount of liquid present. The liquid can be poured from the dispensing reservoir 515 using the outlet 510. When not in use, a cap or other sealing device may be placed over the outlet 510 to prevent liquid from escaping.

To pour a measured amount of liquid from the second chamber 500, an amount of liquid is directed to the dispensing reservoir 515. To do this, the second chamber 500 is manipulated to direct the liquid stored in the main body 535 to the dispensing reservoir 515 through the angled connection 520. The graduated portion 525 allows for an accurate amount of liquid to be present in the dispensing reservoir 515. The second chamber 500 may then be tilted to pour the measured liquid from the dispensing reservoir 515. The angled connection 520 and the shape of the second chamber 500 prevents the liquid remaining in the main body 535 from escaping into the dispensing reservoir 515. This allows for both a storage means for the liquid, but also the ability to deliver a desired amount of liquid. The second chamber 500 may have contoured or shaped sides 530 to allow for a better grip of the second chamber 500 during use.

The embodiments described herein may also have a isosceles trapezoidal cross-sectional shape in order to lower the center of gravity of the exemplary container. This cross-sectional shape will increase the bottom surface area of the container reducing movement and reduce the likelihood of tipping over during transport. In some embodiments, the exemplary containers, including both the first and second chambers, may be 11 inches long by 9 inches wide (at the base) by 7 inches tall.

What is claimed is:

1. A liquid material storage and dispensing device, comprising:

a container having exterior walls and a single internal partition therein;

wherein said partition is sloped having a lowest point;

a first chamber defined by said exterior walls and said partition, said first chamber adapted to store a first fluid therein;

a second chamber defined by said exterior walls and said partition, said second chamber having side portions, a top portion and a bottom portion, said second chamber adapted to store a second fluid or a mixture of said first and second fluids therein, and said second chamber arranged atop said first chamber, wherein said partition spans the entire length and width of said second chamber forming said bottom portion;

a dispensing device affixed to said exterior wall and said partition such that said dispensing device passes vertically through said exterior wall, through said second chamber, said second fluid, and through said partition, and which is configured to move into said first chamber to reach an open position when said dispensing device is operated, and retract to a closed position when said dispensing device is not operated;

a first port in said container for delivery of the first fluid into said first chamber;

a second port in said container for delivery of the second fluid into the second container; and a fixed guard extending from said container to inhibit inadvertent operation of said dispensing device;

a vent associated with said first chamber;

wherein said device is adapted to substantially separate the first fluid in said first chamber from the second fluid in said second chamber after said first port and said second port are closed in an intended manner; and wherein, with said first port and said second port closed in an intended manner, said dispensing device is adapted to be operated independently of said first port and said second port to allow an amount of second fluid from the second chamber to pass into the first chamber and mix with said second fluid when said device is in an upright position and such that said dispensing device is adapted to automatically retract after operation to allow a remaining amount of the second fluid in said second chamber to be stored substantially separate from fluid in said first chamber;

wherein said dispensing device passes through said partition at its lowest point and is extended into said first chamber above said first fluid so as to facilitate the mixing of said first fluid and a measured amount of said second fluid while preventing the contamination of said second fluid stored in said second chamber.

2. The device of claim 1, further comprising a transparent graduated panel in said exterior wall of said container.

3. The device of claim 2, further comprising a non-slip material applied to a bottom portion of the exterior walls of said container.

* * * * *